April 1, 1969     E. C. HALLOCK     3,435,574

EXPANSION JOINT COVERS

Filed July 25, 1966

INVENTOR
EDWARD C. HALLOCK
BY

HIS ATTORNEYS

United States Patent Office 3,435,574
Patented Apr. 1, 1969

3,435,574
EXPANSION JOINT COVERS
Edward C. Hallock, 86 Woodland Ave.,
Summit, N.J. 07901
Filed July 25, 1966, Ser. No. 567,706
Int. Cl. E04b 1/68; E04c 1/34; E04f 15/14
U.S. Cl. 52—278          5 Claims

ABSTRACT OF THE DISCLOSURE

An expansion joint cover for closing an expansion joint between a pair of structures including an attachment member forming a U-shaped socket having at least one resilient arm portion and serrations at the interior of the socket. Adjacent the socket is a flange extending in such a direction from the socket so that it may be secured to the exposed surface of one of the structures to have the socket extending into the expansion joint. A cover member spanning the joint and including opposite longitudinal edges parallel to the structures has a rib extending from its underside, the rib having an end hook portion for insertion into the socket to engage the serrations, thereby securing the cover member to one of the structures so that it is movable therewith.

---

This invention relates to improvements in covers for expansion joints in the floors, walls, ceilings and other structures, and relates more particularly to an expansion joint which can be assembled quickly and with a minimum of difficulty and provides an effective covering and seal for such an expansion joint.

The joint covers provided heretofore usually include attaching members, such as aluminum extrusions which are secured to building structures on opposite sides of an expansion joint and a cover plate which is secured to one or both of the attached members in order to position the edges of the joint cover plate in engaging relation to the structures with the cover plate spanning the joint therebetween. Most of the prior expansion joint covers require the attaching members to be secured by screws or to be cast in the structure, and most of them involve complex means for securing the cover plate to one or both of the attaching members.

In accordance with the present invention, an expansion joint cover is provided which includes one or more spring-retaining members which are secured to only one of the structural members on one side of the expansion joint and a cover plate which is secured to the spring attaching means by a snap-in type of fastening means serving to retain the plate in sealing and sliding engagement with the structural member on the opposite side of the expansion joint.

More particularly, the spring-retaining means includes a flange which can be secured to a structure member and a generally U-shaped spring disposed in the gap of the expansion joint and having one resilient arm or side thereof provided with a series of serrations for locking engagement with a hook-like rib extending from one side of the cover plate to thereby retain the edges of the cover plate or weather strips or seals secured thereto in contact with the structural members on opposite sides of the gap.

The new expansion joint does away with the need for continuous extrusions for attachment to the structural members yet enables the cover plate to be secured in position merely by pressing it downwardly so that its hook-like rib engages in the U-shaped spring portion and interlocks with a serration on the spring arm. Due to the shape of the spring portion and the rib, the cover plate is securely locked in position so that it can be displaced only with considerable difficulty. Nevertheless the resiliency of the spring portion or portions enables the cover plate to maintain contact with the structural members despite relative movements therebetween in different planes.

Figure 1:
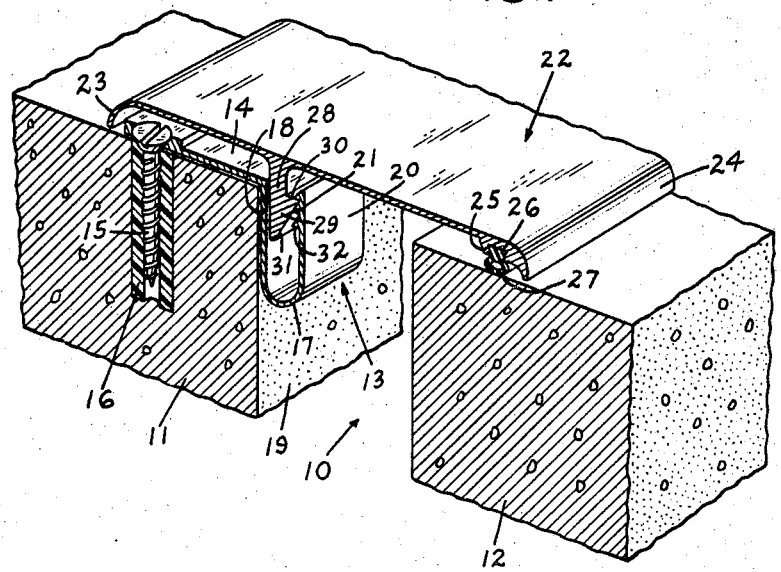
Figure 2:
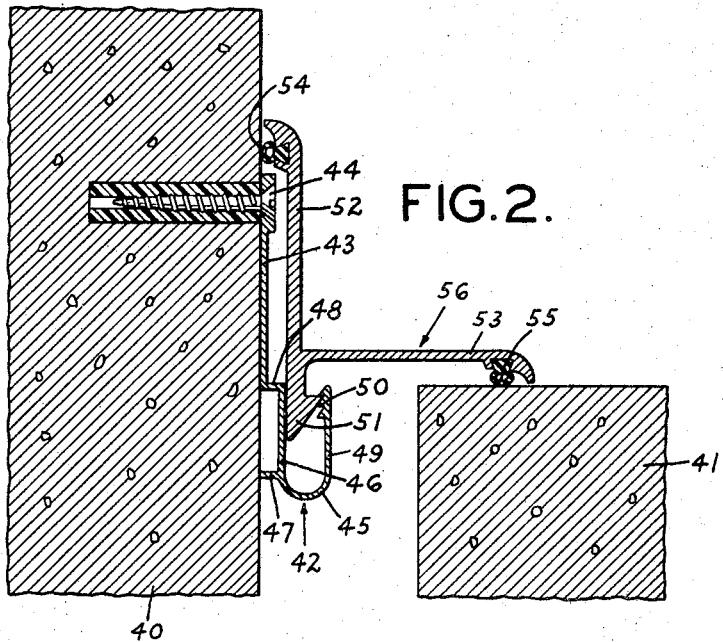

For a better understanding of the present invention, reference may be had to the accompanying drawings, in which:

FIGURE 1 is a cross-sectional and perspective view of a typical expansion joint cover embodying the present invention; and FIGURE 2 is a view in cross-section of a modified form of expansion joint suitable for use for covering an expansion joint between perpendicularly related structural elements.

The form of the invention disclosed in FIGURE 1 is used for covering the gap 10 of an expansion joint between a pair of structural elements 11 and 12, such as, for example, two sections of concrete flooring. Attached to the floor section 11 is a spring-retaining member 13 having a flange portion 14 adapted to be secured to the section 11 by means of one or more screws 15 and, if required, insert plugs 16 of known type. When the floor section 11 is formed of wood or the like, the insert 16 is, of course, not required.

At the inner end of the flange 14 is a generally U-shaped spring portion 17 extending into the gap 10. One arm 18 of the spring portion is adapted to bear against the surface 19 of the floor section 11. An opposite upwardly curved free arm 20 is provided with a plurality of serrations 21 adjacent its upper end. The spring-retaining member can be of relatively narrow transverse dimensions, for example, an inch to 2½ inches in extent and a plurality of such spring retainers can be cut from a continuous extrusion having a cross-sectional shape of the type described. Cooperating with one or more of the spring retainers 13 is a cover plate 22 which has a relatively flat mid portion and downwardly or convexly curved edges 23 and 24. The edge 24 may be provided with a thickened portion 25 provided with a dovetail groove 26 for receiving a resilient weather strip or seal 27 formed of vinyl plastic, rubber or the like. The other edge 23 may also be provided with a seal or weather strip, but as illustrated, bears directly against the upper surface of the floor section 11.

About midway between the edges 23 and 24 of the cover plate 22 is a rib 28 which is provided with a hook-like end portion 29 having an upper surface 30 substantially parallel with the midportion of the plate 22 and a downwardly inclined camming surface 31. The serrations 21 are also provided with undersurfaces 32 which are complemental to or parallel with the surfaces 30 of the hook-like portion. Accordingly, when the cover plate 22 is positioned so that the rib 28 is above the open side of the U-shaped spring, and the cover plate is pressed downwardly, the rib will enter the open, upper end of the spring portion and the surface 30 will engage beneath the undersurface of one of the serrations 21, thereby locking the cover plate 22 against upward movement with the edge 23 and the weather strip 27 in engagement with the upper surfaces of the floor sections 11 and 12. Inasmuch as the rib 28 bears against the arm 18 of the spring, the cover plate is retained against displacement to the left as viewed in FIGURE 1, while the resiliency of the arm 20 also limits the movement of the cover plate to the right, although permitting some rocking movement of the plate if one of the sections 11 or 12 should move upwardly or downwardly. In this way, relative motion of the sections 11 and 12 can occur while contact is maintained between the sealing strip 27 and the outer surface of section 12 and without in any way limiting such relative movement. The cover plate can be removed, if necessary, by pushing it forcefully to the right and then lifting and rocking it so that the surface 30 of the hook assumes an inclined relation to the serration with which it is in engagement and allowing the hook to be disconnected from the spring member 13 or the several spring members which are secured along the face 19 of the floor section 11.

FIGURE 2 illustrates a modified form of cover for an extension joint between a vertical structural element 40 and a horizontal structural element 41 for example, between a floor and wall or a wall and a ceiling. In this form of the invention, the spring-retaining member 42 includes a flange or plate 43 which is secured by means of a screw 44 to the structural element 40. Offset from the flange 44 is the U-shaped spring portion 45 which include an inner arm 46 maintained in spaced relation to the surface of the structural element 40 by means of a rib 47 and the offset portion 48 at the lower end of the flange 43. The other arm 49 has serrations 50 adjacent its upper free end for cooperation with the hook member 51 which extends downwardly at the junction of two right angularly related plate portions 52 and 53, each of which carries a weather strip 54 and 55 for engagement respectively with right angularly related surfaces of the structural elements 40 and 41.

The cover plate 56 which includes the plate portions 52 and 53 can be secured to the building structures in the manner described above, namely, by pushing the hook member 51 into the open, upper side of the U-shaped spring 45 so that the hook portion engages a lower surface of one of the serrations 50, thereby locking the cover plate 56 in position. Sliding movement can occur between the sealing strip 55 and the upper surface of the structural element 41 in response to relative movement between the elements 40 and 41.

The above-described expansion joint covers require a minimum amount of material in their construction since the spring members may be widely spaced along the length of the expansion joint and need be provided only on one of the structural elements at one side of the expansion joint. No tools are required for the installation of the cover plate and only simple tools are required for securing the spring members in position on the structural elements, thereby reducing the amount of equipment required and greatly facilitating the installation of the joint cover with resulting savings in installation costs, equipment and material.

It will be understood that the expansion joint covers can be modified in appearance as, for example, by providing knurled or corrugated surfaces thereon, by modification as to size depending upon requirements, and in the materials from which the joint covers are made.

Accordingly, the forms of the invention described herein should be considered as illustrative and not as limiting the scope of the invention as defined in the folowing claims.

I claim:
1. An expansion joint cover comprising an elongated cover member for spanning an expansion joint between a pair of structures and having opposite longitudinal edges, a rib extending from one side of said cover member between and substantially parallel to said edges, a hook portion on said rib, at least one attaching member forming a resilient U-shaped socket having at least one resilient arm portion and an opposite arm portion, attaching flange means on one of the arm portions of said socket for securing said attaching member to one of said structures to be movable therewith and with said socket extending into the joint underneath said rib, and serrations in said socket on one of said arm portions, said hook portion being inserted within and reacting with said socket to positively engage said serrations to secure said cover member to said one of said structures with said longitudinal edges engaging both of said structures.

2. The expansion joint cover set forth in claim 1 in which said cover member comprises a pair of right-angularly related plate portions and said rib extends from about the junction of said plate portions.

3. The expansion joint cover set forth in claim 1 in which said cover member is substantially flat and comprises a sealing strip at one of said edges for engaging the other of said structures.

4. The expansion joint cover set forth in claim 1 in which said hook portion comprises a surface substantially parallel to at least a portion of said cover member and facing toward said one side of the member, said serrations having surfaces thereon substantially parallel to and facing away from said cover member, and inclined surfaces on said hook member and said serrations facilitating insertion of said hook member into said U-shaped socket.

5. The expansion joint cover defined in claim 1, in which the longitudinal edges of said cover member are turned downwardly toward the side of the member from which the rib extends and the cover member is transversely dimensioned to extend over and conceal the attaching flange means when said serrations positively engage the hook portion.

References Cited
UNITED STATES PATENTS

| | | | |
|---|---|---|---|
| 2,035,476 | 3/1936 | Herwood. | |
| 2,160,758 | 5/1939 | Schurman. | |
| 2,226,886 | 12/1940 | Willis | 94—18.2 |
| 3,183,626 | 5/1965 | Schmitt | 52—573 |
| 3,270,474 | 9/1966 | Driggers | 52—573 X |
| 3,331,171 | 9/1967 | Hallock | 52—396 X |

JACOB L. NACKENOFF, *Primary Examiner.*

U.S. Cl. X.R.

52—287, 395, 396, 466; 94—18